United States Patent
Risch et al.

(10) Patent No.: US 6,786,466 B1
(45) Date of Patent: Sep. 7, 2004

(54) ELECTROMAGNETIC VALVE SUPPORT

(75) Inventors: Stephan Risch, Weiterstadt (DE);
Wolfgang Käfer, Frankfurt (DE);
Andrea Heise, Mörfelden (DE); Jürgen Peter Gilb, Bad Homburg (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/958,707

(22) PCT Filed: Apr. 10, 2000

(86) PCT No.: PCT/EP00/03169

§ 371 (c)(1),
(2), (4) Date: Jan. 22, 2002

(87) PCT Pub. No.: WO00/63053

PCT Pub. Date: Oct. 26, 2000

(30) Foreign Application Priority Data

Apr. 15, 1999 (DE) .......................... 199 17 117
Aug. 27, 1999 (DE) .......................... 199 40 696

(51) Int. Cl.[7] .............................................. F16K 31/02
(52) U.S. Cl. ................ 251/129.15; 137/884; 303/119.3
(58) Field of Search .......................... 303/119.3, 119.2, 303/119.1; 251/129.15; 137/884

(56) References Cited

U.S. PATENT DOCUMENTS

| | | | | |
|---|---|---|---|---|
| 5,038,125 A | * | 8/1991 | Vogel ...................... | 303/119.2 |
| 5,269,490 A | * | 12/1993 | Fujikawa et al. ....... | 251/129.15 |
| 5,462,344 A | * | 10/1995 | Jakob et al. ............ | 303/119.3 |
| 5,474,108 A | * | 12/1995 | Inden et al. ............. | 137/884 |
| 5,681,099 A | * | 10/1997 | Steffes et al. ........... | 303/119.2 |
| 5,823,507 A | | 10/1998 | Inden et al. | |
| 5,845,672 A | | 12/1998 | Reuter et al. | |
| 6,048,041 A | * | 4/2000 | Mueller et al. .......... | 303/119.2 |

FOREIGN PATENT DOCUMENTS

| | | |
|---|---|---|
| DE | 88 13 836 | 4/1989 |
| DE | 41 00 967 | 7/1992 |
| DE | 195 08 011 | 9/1995 |
| DE | 195 18 519 | 11/1996 |
| DE | 196 39 198 | 3/1997 |
| DE | 196 19 968 | 11/1997 |
| DE | 197 47 142 | 5/1998 |
| DE | 198 33 498 | 1/1999 |
| DE | 197 43 842 | 4/1999 |
| WO | 94/26568 | 11/1994 |
| WO | 97/35752 | 10/1997 |

OTHER PUBLICATIONS

Search Report of the German Patent Office for Appln 19940696.0.

* cited by examiner

*Primary Examiner*—John Bastianelli
(74) *Attorney, Agent, or Firm*—Rader, Fishman & Grauer PLLC

(57) ABSTRACT

A valve coil support, in particular for automotive vehicle brake pressure control systems, including at least one valve coil in a frame-shaped wall portion for mounting onto a hydraulic or pneumatic pressure control device which has at least one valve in a fluid channel that is electromagnetically operable by means of the valve coil for pressure fluid control, wherein the frame-shaped wall portion is closed on the frontal end remote from the pressure control device, and wherein at least one component is arranged within the frame-shaped wall portion for connecting the valve coil to an electronic controller. The valve coil is directed to a bottom which is connected to the frame-shaped wall portion and protects the valve coil after assembly of the valve coil support on the pressure control device against the effects of moisture, and wherein the valve coil for installation in the valve coil support is inserted into the frame-shaped wall portion exclusively in the direction of the bottom.

11 Claims, 2 Drawing Sheets

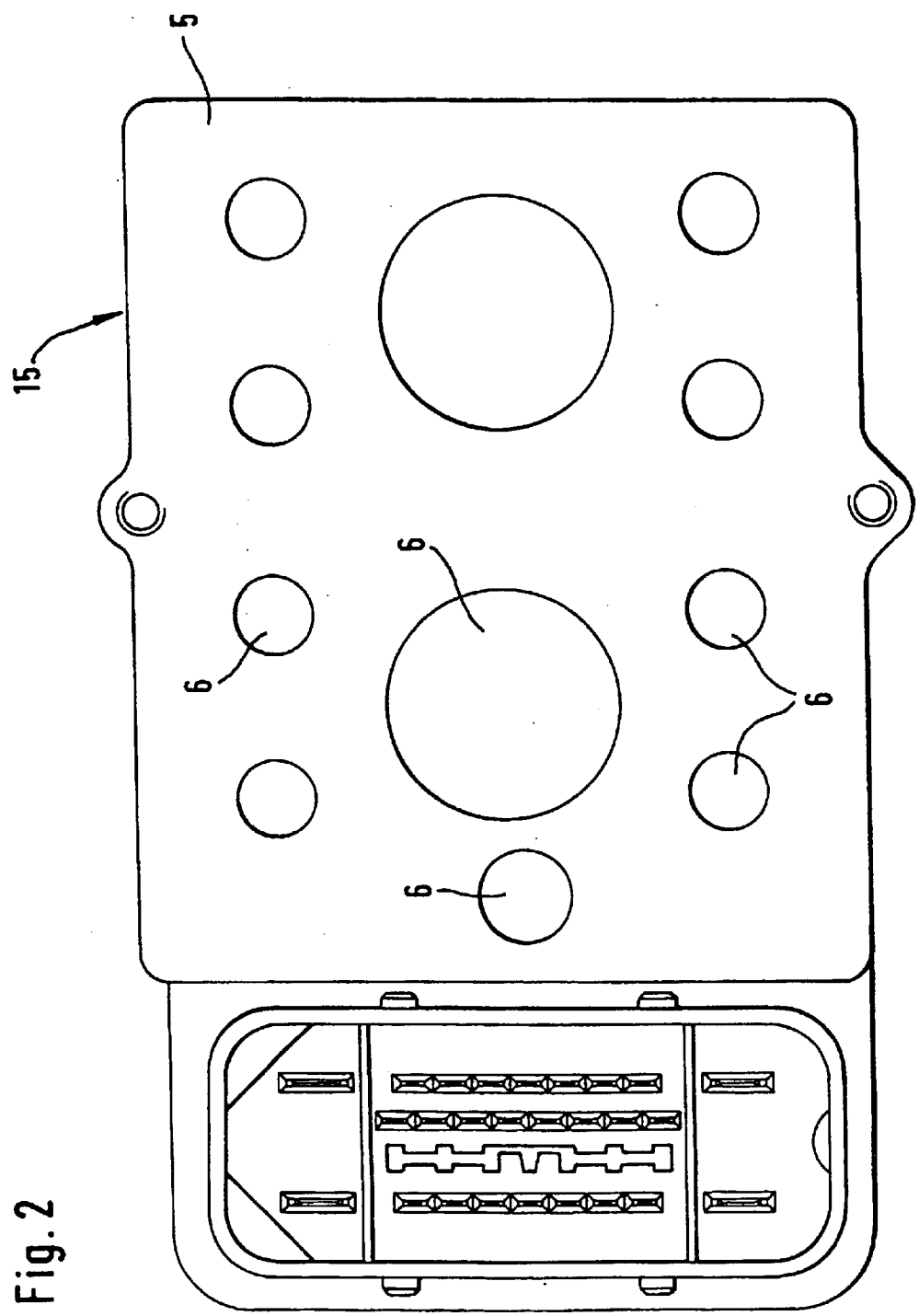

ELECTROMAGNETIC VALVE SUPPORT

TECHNICAL FIELD

The present invention generally relates to vehicle brakes and more particularly relates to a valve coil support, in particular for automotive vehicle brake pressure control systems.

BACKGROUND OF THE INVENTION

DE 43 25 412 A1 discloses a valve coil support which includes in a frame-shaped wall portion a number of valve coils for mounting onto an electrohydraulic pressure control device. The pressure control device includes channels in which valves are inserted that are actuated electromagnetically by the valve coils arranged in the valve coil support. The frame-shaped wall portion is closed by a cover on the frontal end remote from the pressure control device, and a board for the accommodation of the valve coils and the electronic components of an electronic controller is arranged in a sealed fashion between the cover and the wall portion.

To seal the valve coils in the valve coil support, there is need for comprehensive constructive efforts which, among others, necessitate a circumferential seal between the frame-shaped wall portion and the pressure control device. To this end, accurate sealing surfaces along the joining portions are required for the proper sealing of the valve coils. Another disadvantage of the known valve coil support is seen in the complicated manufacture of a large number of single parts which, furthermore, must be inserted in a rather sophisticated fashion in opposite assembly directions into the valve coil support.

Generic publication DE-A-198 33 498 discloses a control device for a hydraulic brake system whose valve coil support includes a frame-shaped wall portion which is limited on the bottom side by a plate-shaped coil mounting support and on the top side by a cover shaped to provide a horizontal wall portion. A switchboard is arranged on the cover and closed by a lid mounted onto the frame-shaped wall portion. For the manufacture of the control device, the switchboard must be fitted from above onto the valve coil support, while the valve coils must be inserted from the bottom side of the valve coil support into the cavity of the frame-shaped wall portion. To this end, removal of the plate-shaped coil mounting support from the valve coil support is required. Consequently, assembly of the valve coils and the switchboard to be connected to the valve coils is effected from opposite directions on the valve coil support, whose frame-shaped wall portion is furnished with sealing matter on the respectively opposite sides.

In view of the above, an object of the present invention is to improve upon a valve coil support of the initially mentioned type to such effect that a humidity-proof sealing of the functionally relevant components within the frame-shaped wall portion is ensured by simplest possible means, permitting particular ease of manufacture and assembly in the valve coil support.

BRIEF DESCRIPTION OF THE DRAWING

FIG. 2 is a top view of the configuration of the openings in the bottom of the valve coil support shown in FIG. 1.

DETAILED DESCRIPTION OF THE PREFERRED EMBODIMENTS

Figure 1:
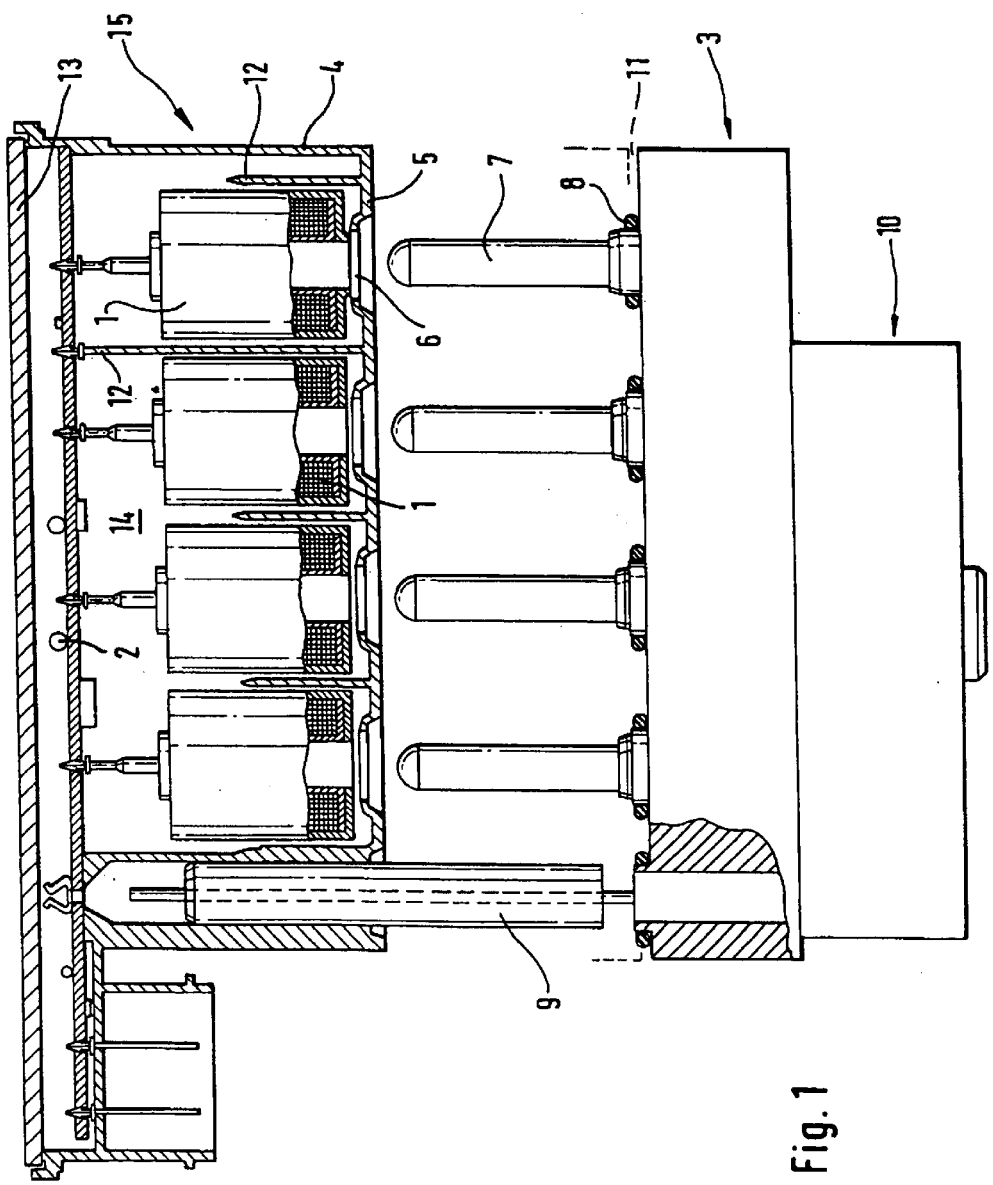
FIG. 1 is a longitudinal cross-section taken through a valve coil support before mounting onto a pressure control device.

The FIG. 1 embodiment shows an enlarged schematic view of a valve coil support 15 for an automotive vehicle brake pressure control system, comprised of a frame-shaped wall portion 4 for mounting onto a pressure control device 3 arranged below the valve coil support 15. Pressure control device 3 includes several fluid channels in which the valves are incorporated that are actuated by the valve coils 1 arranged in the valve coil support 15. On the frontal end remote from the pressure control device 3, the frame-shaped wall portion 4 (vertical wall portion) is closed in a simple fashion by means of a cover plate (first horizontal wall portion) so as to be protected against dust and moisture.

The cover plate assumes the function of the cover 13 which closes the frame-shaped wall portion 4 from the top. Below the cover 13, the frame-shaped wall portion 4 accommodates electromechanic and electronic components 2 for the connection of valve coils 1 to an electronic controller which, in the present embodiment, as a circuit support member equipped with the necessary components 2 and together with the valve coils 1 attached thereto, is inserted into the valve coil support 15. It is suggested to this end that the valve coils 1, which are arranged in several rows in the valve coil support 15 in the present embodiment, along with the components 2 provided for the connection of the valve coils 1 to the electronic controller, are inserted from above into the frame-shaped wall portion 4 exclusively from one single assembly direction facing the pressure control device 3.

Thus, in the embodiment shown, the electromechanic and electronic components 2 with the circuit support member according to the illustration are inserted as a preassembled unit with the attached valve coils 2 and the associated yoke sheets into the valve coil support 15 in the direction of a bottom 5 (second horizontal wall portion) arranged at the bottom edge of the wall portion 4. The frame-shaped wall portion 4 subsequently needs to be closed only at its top edge by the cover 13. The area of the valve coil support 15 close to the pressure control device 3 with its substantially plate-shaped bottom 5 assumes a sealing function on the pressure control device 3 as soon as the valve sleeves 7 which project from the pressure control device 3 extend into the openings 6 on the bottom 5 and are pressed against the bottom 5 by means of a local gasket 8 fitted on each valve sleeve 7.

Similar to the openings 6 on the bottom 5 provided for the valve sleeves 7, another opening 6 is provided in the plate-shaped bottom 5 for the passage of an electric contacting means in the shape of a plug contact 9 which projects from the pressure control device 3. Thus, also the plug contact 9 provided on the pressure control device 3 for the motor-and-pump assembly 10 projects into the valve coil support 15 in a dust-proof and humidity-proof manner.

An annular gasket 8 is e.g. arranged in the area of the opening 6 between the bottom 5 and the plug contact 9 which extends through the pressure control device 3. Gasket 8, exactly as the individual gaskets 8 on the valve sleeves 7, is preferably arranged on the frontal end of the pressure control device 3 which faces the bottom 5 and is penetrated by the plug contact 9. The gaskets 8 of the corrosion-sensitive valve coils 1 and of the plug contacts 9 can expediently be achieved by using elastomeric seals. Due to the axial press fit of the bottom 5 onto the frontal end of the pressure control device 3 facing the bottom 5, a preloading force that assists the sealing effect is active as soon as the valve coil support 15 has reached the final assembly position on the pressure control device 3.

The fact that the annularly illustrated gaskets 8 are preassembled directly on the valve sleeves 7 and the plug contact 9 achieves a particularly simple way of fixing the gaskets 8 on the frontal end of the pressure control device 3. The gaskets 8 are configured as ring seals or O-rings according to the drawings. Alternatively, it is also feasible to use flat seals or a gasket 8 configured as sealing mats which are respectively arranged in the peripheral area of the valve sleeves 7 and the plug contact 9. In this arrangement, an interspace 11 that is not sealed, accessible to atmospheric pressure and insusceptible to corrosion principally remains in the peripheral area of the opening 6 and, namely, between the bottom 5 and the frontal end of the pressure control device 3 facing the bottom 5 after the final assembly of the valve coil support 15 on the pressure control device 3. Space 11 is fluid-tightly isolated from the cavity 14 of the valve coil support 15 by the respective gasket 8 at the valve sleeve 7 concerned and/or at the plug contact 9. For easy assembly and alignment of the subassembly formed by the valve coils 1 and the components 2 in the valve coil support 15, webs or partition walls 12 are arranged on the bottom 5 and extend paraxially to the valve coils 1 in opposition to the direction of installation of the valve coils 1 into the cavity 14 of the frame-shaped wall portion 4. Wall portion 4 along with the bottom 5 and the partition walls 12 forms a one-part assembly unit which is preferably made in a plastic injection molding operation.

To illustrate the total structure of the valve coil support 15 more clearly, FIG. 2 is referred to which shows in a top view from the direction of the pressure control device 3 the schematic arrangement of the openings 6 in two rows on the bottom 5. Between the two rows, two relatively large openings 6 are illustrated side by side in the bottom 5 of the valve coil support 15. Different from the openings 6 previously described for the accommodation of the valve sleeves 7 and the plug contact 9, said large openings 6 intentionally do not have any sealing provisions because these openings 6 ensure ventilation and evacuation of the low pressure accumulators which project from the pressure control device 3 between the two rows of the valve sleeves 7.

A particularly simple assembly and sealing of corrosion-critical components becomes possible by the chosen design of the valve coil support 15 and its interaction with the pressure control device 3, without the need to safeguard especially accurate conditions of the surfaces on the pressure control device 3 and on the valve coil support 15. The result is that the valve coils 1 with their yoke sheets and the valve sleeves 7 are not exposed to moisture that acts from the outside by spray water or the like so that low-cost and easy-to-make materials can be used for the mentioned parts which, thus, are no longer required to satisfy the previous demands placed on a special corrosion protection.

Additionally, the present invention permits sealing of the valve coils 1 which is largely independent of manufacturing tolerances and rough surface conditions. Hence, a low-cost sealing arrangement is achieved by the present invention which ensures an almost tolerance-free alignment and sealing of the valve coils on the valve sleeves 7, irrespective of the extent the valve coils 1 and the associated yoke sheets deform axially and radially for alignment at the valve sleeves 7. This also obviates the need for the known spray-coating and embedding provisions of the valve coils 1 and the sealing means which previously had to be applied in a liquid manner during the manufacture of the valve coil support 15.

Assembly is also facilitated when alternatively to the explained assembly method the operable valve coils 1 along with the electric and electronic components 2 are inserted as a preassembled unit into the valve coil support 15 (from the top side which is initially not yet closed by the cover 13) only after the attachment of the frame-shaped wall portion 4 on the pressure control device 3. On the other hand, it is also possible to slip the housing of the valve coil support 15, which is checked for operability and, thus, is prefitted so as to be ready for operation, with its generously sized circular openings 6 on the bottom 5 onto the protruding valve sleeves 7 and the plug contact 9.

Due to an appropriate elastic suspension in the valve coil support 15, the valve coils 1 can center resiliently on the valve sleeves 7. Instead of the O-rings according to the present drawings having the function of gasket 8, it is of course possible to use alternative sealing means such as e.g. punched seals or hose portions which are either slipped over the valve sleeves 7 and the laterally illustrated plug contact 9 before the valve coil support 15 is mounted onto the pressure control device 3, or which may also be fitted directly on the bottom 5 under defined conditions, as the need may be. The gasket 8 at the moisture-sensitive points of the valve coil support 15 does not permit preventing the ingress of moisture which is due to the interspace 11 that remained between the pressure control device 3 and the valve coil support 15 after the assembly. However, the influence of moisture at the wetted points has no effect on the function of the total assembly unit.

As has already been described with reference to FIG. 2, the interspace 11 rather favors the exchange of gas among the low-pressure accumulators disposed between the valve rows. A large-surface frame-shaped sealing arrangement along the outside periphery of the pressure control device 3 would hinder the ventilation and evacuation of the low-pressure accumulators when the low-pressure accumulators extend into the valve coil support 15 as proposed above. Due to the design of the valve coil support 15, advantageously, there is no need for spray-coating the valve coil wires, which would be sophisticated in terms of manufacture and cost. The valve coil wires contact the circuit support member, for example, as press-in or plug connectors.

With respect to the plug contact 9 which renders the current supply of the motor-and-pump assembly 10 possible, it is preferable to make contact 9 from a so-called rod-shaped material sold by the meter, or that it consists of a ring similar to a two-wire line. Insofar as the two relatively stiff wires which are spaced from one another permit a channel which extends in an axial direction, a particularly simple pressure supply channel between the interior of the electric motor and the valve coil support 15 is achieved. Using an annular gasket 8 at the plug contact 9 according to the present invention permits protecting both the interior of the motor-and-pump assembly 10 and the cavity 14 in the valve coil support against atmospheric influences and the operational effects in an automotive vehicle brake system, especially due to moisture effects caused by spray water or water of condensation.

With respect to the disclosed gasket 8 of the valves, two sealing areas are respectively employed which as contact surfaces are alternatively disposed either in an axial direction and, thus, in the assembly direction, between the bottom 5 and the used seal, and in a radial direction between the valve sleeve 7 and the seal. As an alternative, the two sealing areas can be represented in the axial direction for the gasket 8 between the bottom 5 and the pressure control device 3 or the valve seat which is possibly just contacted by the selected gasket 8. The abutment surface of the gasket 8 on the pressure control device 3 can also act as additional sealing surface in the form of a rough sealing, if this is desired or required. The abutment surface, in combination with the gasket 8 on the valve sleeve 7, can also hold back effectively the fluid volume, which is possibly oozing out of the attachment area of the valve or the valve sleeve 7 in the pressure control device 3, from the fluid-sensitive valve coil support.

It is important for the sealing measures presented that the respectively selected seal between the valve coil 1 and the pressure control device 3 on the bottom 5 disposed inbetween is mainly stressed in an axial direction and, hence, in the assembly direction of the assemblies.

In this arrangement, the seal for presenting the structural shape of the gasket 8 can be configured as an injection-molded form seal or also as a sealing mat which includes several ring seals for several valves. In addition, the seal can be used as an elastic support for the yoke ring or the coil form of the valve coil 1.

With respect to the partition wall 12, it may be added that the wall, as the case may be, can extend up to the electronic components 2 in the capacity of a supporting wall which can be connected, for example, to a printed circuit board accommodating the components, especially, by means of a clip or a like element.

Depending on the shaping of the yoke rings, the said can be supported within the openings 6 in a radial direction on the bottom 5, whereby mounting is simplified when the subassemblies are joined.

The plug contact 9 that can be figured as a loose or a fixed component which is integrated either in the valve coil support 15 or in the pressure control device 3, and a plug part and a plug-in adapter will also be included in the term 'plug contact'.

What is claimed is:

1. Valve coil assembly, comprising:
    a valve coil mounted within a cavity of a valve coil support, wherein said valve coil support includes a frame-shaped wall portion for mounting onto a hydraulic or pneumatic pressure control device which has at least one valve in a fluid channel that is electrically operable by means of the valve coil, wherein the frame-shaped wall portion forms an opening which is closed on a frontal end remote from the pressure control device by a cover, and
    at least one component for connecting the valve coil to an electronic controller, and wherein the valve coil is directed to a bottom of the frame-shaped wall portion,
    a gasket disposed in said opening of said frame-shaped wall portion, said gasket protecting the valve coil against the effects of moisture,
    a circuit support member residing in said cavity, wherein said circuit support member is fixed to said frame-shaped wall portion, wherein said circuit support member is generally parallel to said bottom of said frame-shaped wall portion,
    wherein the bottom of the frame-shaped wall portion includes a second opening which is arranged coaxially to a plug contact and is adapted to accept the plug contact projecting from the pressure control device for a motor-and-pump assembly accommodated in the pressure control device.

2. Valve coil assembly as claimed in claim 1, wherein the bottom of the frame-shaped wall portion includes a substantially plate-shaped surface with an opening that is arranged coaxially to the valve coil for accepting a valve sleeve of a valve protruding from the pressure control device.

3. Valve coil assembly as claimed in claim 2, wherein said gasket is arranged in the area of the opening between the bottom of said frame-shaped portion and the valve sleeve.

4. Valve coil assembly support as claimed in claim 1, wherein said gasket is provided in the area of the opening between the bottom of the frame-shaped wall portion and the plug contact of the motor-and-pump assembly.

5. Valve coil assembly support as claimed in claim 3, wherein the gasket is made from an elastomeric element which is sealingly biassed by a pressing force that acts on the bottom of the frame-shaped portion towards the housing surface of the pressure control device.

6. Valve coil support as claimed in claim 3, wherein the gasket is fixed in position by the valve sleeve projecting in the direction of the bottom of the frame-shaped wall portion.

7. Valve coil support as claimed in claim 3, wherein the gasket is formed from a ring seal, a flat seal, or a sealing mat.

8. Valve coil support as claimed in claim 2, wherein a non-sealed interspace accessible to the atmospheric pressure is disposed between the bottom of the frame-shaped wall portion and the pressure control device, said interspace being fluid-tightly isolated from said cavity of said frame-shaped wall portion by the gasket.

9. Valve coil support as claimed in claim 2, further including partition walls or pins arranged at the bottom of the frame-shaped wall portion which extend parallel to the valve coil into said cavity of the frame-shaped wall portion.

10. Valve coil assembly, comprising:
    a valve coil mounted within a cavity of a valve coil support, wherein said valve coil support includes a frame-shaped wall portion for mounting onto a hydraulic or pneumatic pressure control device which has at least one valve in a fluid channel that is electrically operable by means of the valve coil, wherein the frame-shaped wall portion forms an opening which is closed on a frontal end remote from the pressure control device by a cover, and
    at least one component for connecting the valve coil to an electronic controller, and wherein the valve coil is directed to a bottom of the frame-shaped wall portion,
    a gasket disposed in said opening of said frame-shaped wall portion, said gasket protecting the valve coil against the effects of moisture,
    a circuit support member residing in said cavity is fixed to said frame-shaped wall portion, wherein said circuit support member is generally parallel to said bottom of said frame-shaped wall portion,
    wherein the bottom of the frame-shaped wall portion includes a substantially plate-shaped surface with an opening that is arranged coaxially to the valve coil for accepting a valve sleeve of a valve protruding from the pressure control device,
    wherein said gasket is arranged in the area of the opening between the bottom of said frame-shaped portion and the valve sleeve.

11. Valve coil assembly, comprising:
    a valve coil mounted within a cavity of a valve coil support, wherein said valve coil support includes a frame-shaped wall portion for mounting onto a hydraulic or pneumatic pressure control device which has at least one valve in a fluid channel that is electrically operable by means of the valve coil, wherein the frame-shaped wall portion forms an opening which is closed on a frontal end remote from the pressure control device by a cover, and
    at least one component for connecting the valve coil to an electronic controller, and wherein the valve coil is directed to a bottom of the frame-shaped wall portion,
    a gasket disposed in said opening of said frame-shaped wall portion, said gasket protecting the valve coil against the effects of moisture, a circuit support member residing in said cavity is fixed to said frame-shaped wall portion, wherein said circuit support member is generally parallel to said bottom of said frame-shaped wall portion, wherein a non-sealed interspace accessible to the atmospheric pressure is disposed between the bottom of the frame-shaped wall portion and the pressure control device, said interspace being fluid-tightly isolated from said cavity of said frame-shaped wall portion by the gasket.

* * * * *

UNITED STATES PATENT AND TRADEMARK OFFICE
CERTIFICATE OF CORRECTION

PATENT NO. : 6,786,466 B1
DATED : September 7, 2004
INVENTOR(S) : Risch et al.

It is certified that error appears in the above-identified patent and that said Letters Patent is hereby corrected as shown below:

Title page,
Item [75], Inventors, "Andrea Heise" should be -- Andreas Heise --.

Signed and Sealed this

Nineteenth Day of April, 2005

JON W. DUDAS
*Director of the United States Patent and Trademark Office*